Aug. 29, 1961 B. STANDIG 2,998,002
COLLAPSIBLE BARBECUE
Filed April 13, 1959 2 Sheets-Sheet 2
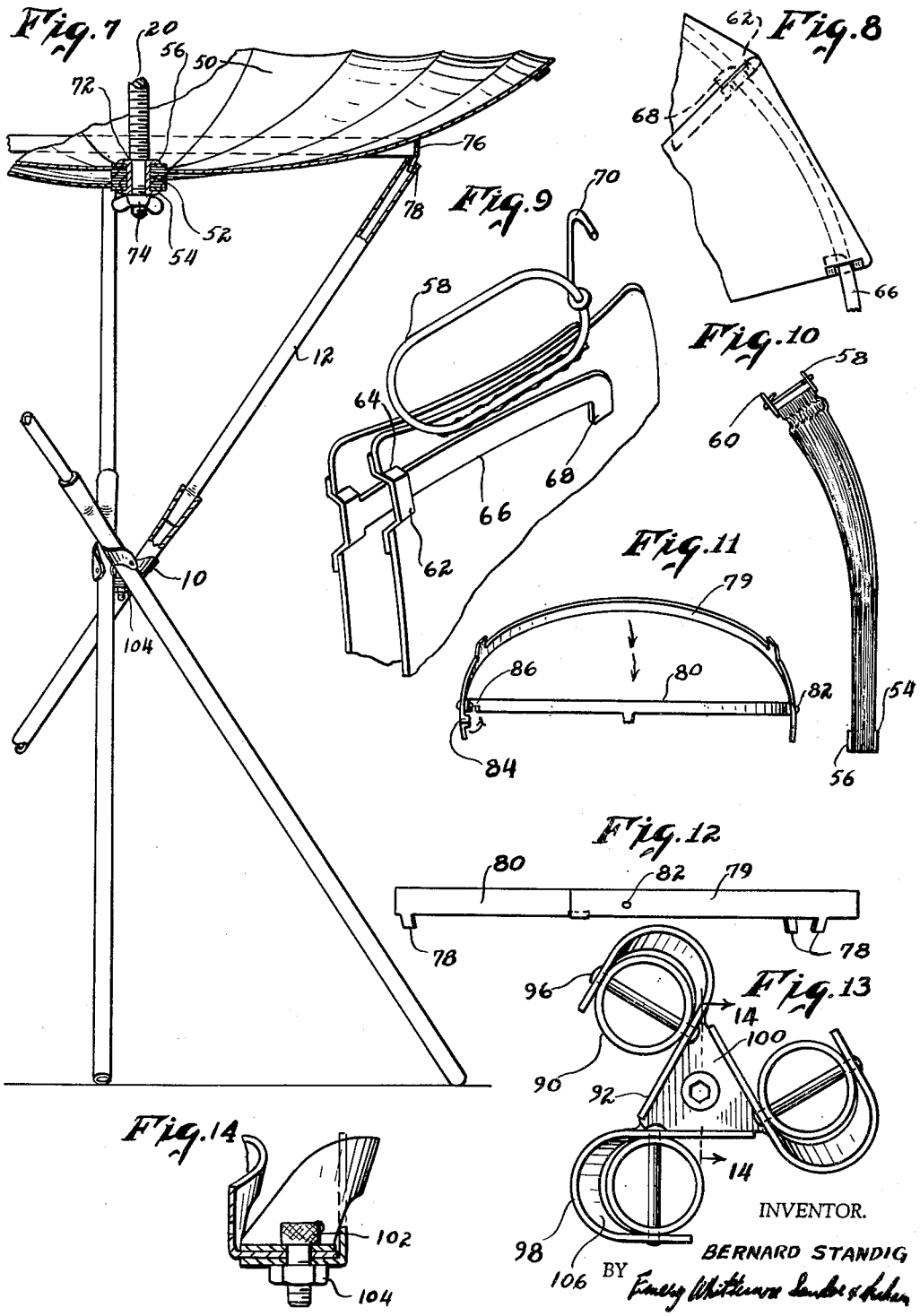
INVENTOR.
BERNARD STANDIG
BY
ATTORNEYS United States Patent Office 2,998,002
Patented Aug. 29, 1961

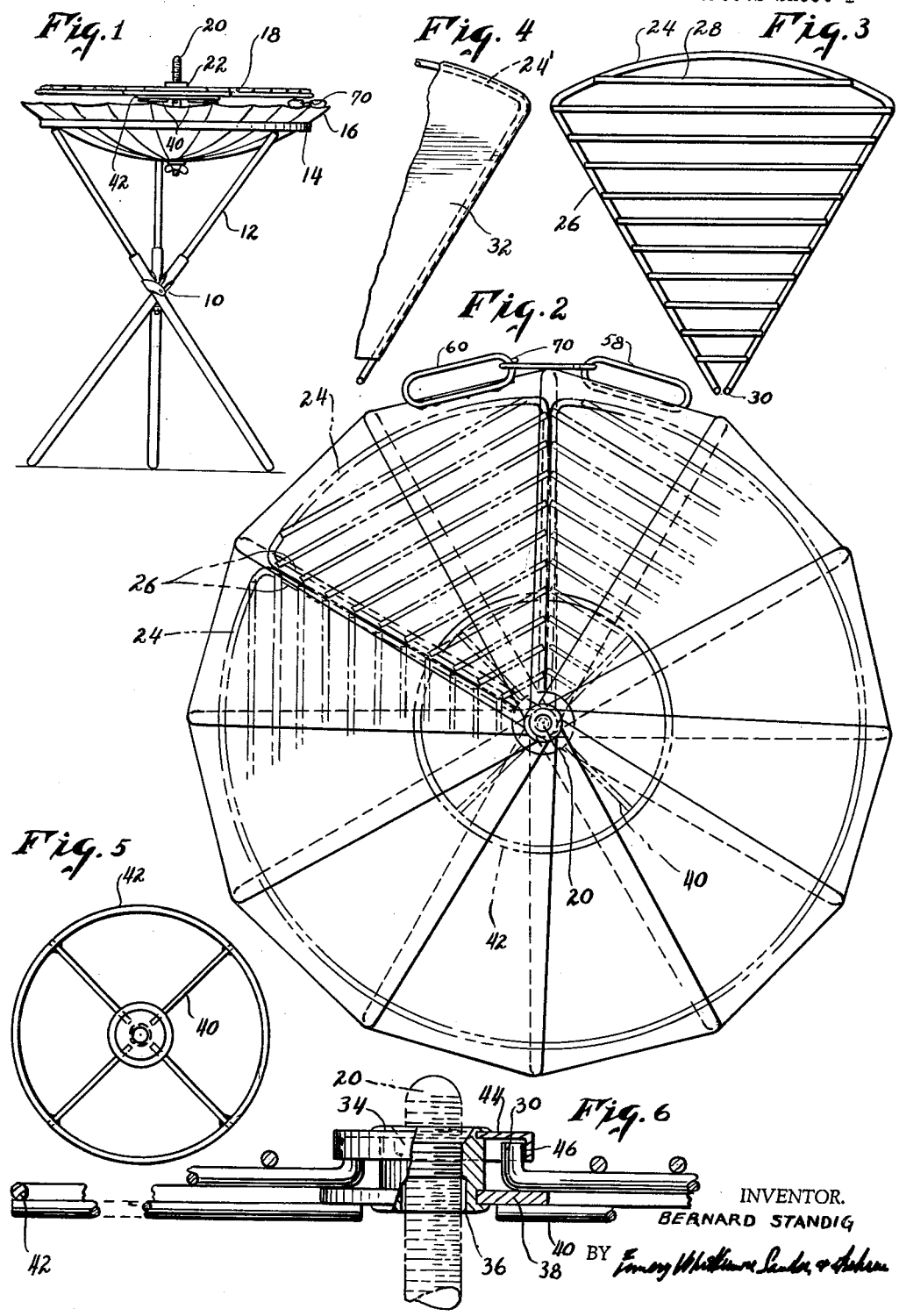

2,998,002
COLLAPSIBLE BARBECUE
Bernard Standig, 138—41 68th Drive, Flushing, N.Y.
Filed Apr. 13, 1959, Ser. No. 805,941
5 Claims. (Cl. 126—25)

This invention relates to outdoor barbecues, and more particularly, to an outdoor barbecue which can be collapsed for ease in transport thereof.

In recent years the movable outdoor barbecue has become an increasingly popular addendum to the household. While the barbecues known to art are movable and are separable into respective parts, the assembled barbecue and the component parts thereof are of such size as to make it extremely difficult to pack in automotive vehicles for use on picnics and the like. Thus the size of the barbecues known to the art obviate one of the major applications thereof.

It is, therefore, the object of this invention to provide an improved barbecue which can be collapsed into small size for transport and can be easily and conveniently set up into useable form without tools or special equipment.

In accordance with this object, I have provided, in a preferred embodiment of this invention, a collapsible barbecue having a grill movably mounted above a fire bowl adapted to contain a bed of coals, such as charcoal. The bowl is mounted on legs to hold the bowl and grill at convenient height. Each part of the barbecue is separable and is collapsible for ease in transport.

The fire bowl comprises a plurality of wedge-shaped sections hinged together at the apex thereof. The bowl can be nested with each section in superimposed relationship for transport. To erect the bowl for use, the sections are fanned apart to form a circular bowl. Suitable means are provided between adjacent sections to position each section in contiguous relationship to adjacent sections when fanned into erected position. The bowl is locked in the erected position by suitable means to prevent inadvertent collapse during use.

To mount the grill, a center post is provided. The center post is erected to the bowl by passage of a threaded portion through an aperture in the bowl hinge connection and securing of the post thereto by a nut.

A hub is provided to threadably engage the center post. An annular grill support is affixed thereto. The grill is formed of a plurality of nestable wedge-shaped grill sections. The sections may be assembled on the grill support in contiguous relationship to form an annular grill. Each grill section is formed with a hook on the apex thereof, which hook co-acts with a skirt on the hub to restrain the section from radial movement. Adjustment of the height of the grill above the fire bowl can be made by rotation of the grill.

The supporting structure comprises a tripod assembly, leg extensions, and a guide band. The tripod assembly comprises three tubular legs swingably mounted so that the legs can be erected into a tripod from a nested position having the three legs in axially aligned relationship. Leg extensions are inserted within the tripod legs in frictional engagement therewith to bring the support height to a convenient level for use. A guide band, formed of two semi-circular sections hingedly connected for nesting in superimposed relationship, is erected to a circular shape. When erected, the guide band is positioned on the legs with inserts spaced along said band inserted within the ends of the tubular extensions. The guide band thus serves to restrain leg movement, providing a rigid supporting structure, and to provide a load distributing ring upon which the bowl is located.

A preferred embodiment is illustrated in the accompanying drawings, of which:

FIGURE 1 is a side elevation of the erected barbecue according to this invention;
FIGURE 2 is a top plan view of the barbecue shown in FIGURE 1;
FIGURE 3 is a plan view of a grill section shown in FIGURE 1;
FIGURE 4 is a partially broken away plan view of an alternative form of grill section;
FIGURE 5 is a plan view of the grill support;
FIGURE 6 is a partially sectioned enlarged view of the grill assembly shown in FIGURE 1;
FIGURE 7 is a partially sectioned enlarged view of the barbecue shown in FIGURE 1;
FIGURE 8 is a broken enlarged plan view of a portion of the bowl shown in FIGURE 7;
FIGURE 9 is an enlarged view of a portion of the bowl shown in FIGURE 8;
FIGURE 10 is a side elevation of the bowl in nested position;
FIGURE 11 is a side elevation of the guide band shown in FIGURE 1 in partially opened position.
FIGURE 12 is a side elevation of the guide band shown in FIGURE 11 in opened position;
FIGURE 13 is a sectional view of the leg assembly of the barbecue shown in FIGURE 1; and
FIGURE 14 is a partially sectioned view taken along line 14—14 of FIGURE 13.

Referring to FIGURE 1 there is shown a barbecue in accordance with this invention in erected form. The barbecue comprises a tripod leg assembly generally designated 10 with extensions 12 inserted therein to bring the tripod to convenient supporting height for the barbecue. The legs are maintained in a tripod arrangement by a guide band 14. Supported by the guide band is a charcoal bowl 16 above which is mounted a grill 18 which is movable along the axis of the center post 20 by rotation of the grill and the resultant co-action of the grill hub 22 with the threadably engaged center post.

The grill is formed of a plurality of grid sections 24 as is best illustrated in FIGURES 2–4. Each of the grid sections is formed of a continuous support wire 24 formed into a wedge-shaped outline having radial extending sides 26. Across the support wire and bonded thereto are grill wires 28. The wedge-shaped outline of each section allows the sections to be erected in circumferentially contiguous relationship to form a complete annular grill upon insertion of all sections in the hub of the grill.

In its preferred form each grill section is formed of a 3/16 in. rod for the support wire and 1/8 in. diameter rod for the grill wire spot welded to said support wire. The wires are nickel plated after assembly. Each end of the support wire is bent upwardly at the apex to form a hook 30.

Thus, the plurality of grill sections may be nested for transport and erected into an annular grill easily and simply. I have found that, in addition to ease of transport, the small grid sections are easily cleaned since the grid sections will easily fit within a normal sink. A rigid annular grill requires special handling in cleaning. In many applications it is desirable that the grill have a continuous surface for frying foods thereon. In such applications the grill section shown in FIGURE 4 may advantageously be employed.

In FIGURE 4 there is shown a grill support wire 24' bent into a wedge-shaped outline identical with that shown in FIGURE 3. However, mounted thereon is a flat metal plate 32 which is spot welded to the supporting wire. The plate may be fabricated from thin gauge steel stock. I have preferred to apply a black oxide finish thereto. Since the plate sections and the grill sections are identical, they may be interchanged to suit the application intended. The grill section and the metal plate sections are inserted within the hub and are supported by a grill support as is best shown in FIGURES 5 and 6.

In FIGURES 5 and 6 there is shown the center post 20 extending upwardly from the center of the bowl. A hub assembly 34 is rotatably mounted in threaded engagement with the center post. I have found it desirable to form a portion of the hub with an unthreaded section 36 to serve as a locating hole. With such a locating hole, the hub can be merely slipped on top of the center post and spun into threaded engagement therewith. The hub is provided with an annular member 38 extending therefrom to which are welded axially extending rods 40. The rods 40 terminate at an annular grill support rod 42 and are welded thereto into supporting relationship therewith. I have found it preferable to fabricate the radially extending rods and the annular grill support of 3/16 in. rod which is nickel plated after assembly.

The hub is provided with an annular member 44 having a downwardly depending skirt 46. Each grill section may be then inserted within the hub by tipping it and insertion of the hook 30 between the skirt 46 and the annular member 38. The grill section can then be lowered into supported relationship with the annular grill support rod 42. The grill section is restrained from movement in a radial direction by the co-action of the hook 30 on the apex thereof with the downwardly depending skirt 46. I have found it preferable to form the annular member 38 of an annular steel washer. The annular member 44 may also be formed from a stock steel washer with a dependent skirt die-stamped therein.

The barbecue bowl 16 is foldable from the erected position to a nested position occupying small space. The structure of the bowl and the co-operation of the structural parts through erection and nesting is best shown in FIGURES 7–10.

In these figures the barbecue bowl is shown as comprising a plurality of wedge-shaped sections 50. Each section is curved both in the radial and tangential directions, so that in the erected position the sections will be contiguous to adjacent sections forming a bowl. Each section is preferably formed of 20 gauge steel having a black oxide finish applied thereto. The apex of each section extends in overlapping relationship with the other sections, and the sections are hingedly connected by a hub 52 passing therethrough. I have found it preferable to form the hub of pipe adapted to fit within a 7/8 in. hole formed in the apex of the bowl sections and having a peaned over portion 54 and 56 to secure the bowl sections together.

The bowl may be folded by rotation of each section so that the sections are nested in super-imposed relationship, as shown in FIGURE 10. In order to easily erect and nest the bowls, a handle 58 formed of rod stock is welded to the bottom of the lower bowl section and a handle 60 is welded to the top of the upper bowl section.

To ensure that the bowl sections may be fanned open from the nested position, means coupling each section are provided to position each section in contiguous relationship to adjacent sections when opened. The coupling means extend between adjacent sections so that when the user pulls on the top and bottom sections, the intermediate sections are opened in fan-like arrangement. The coupled means comprise a hi-hat 62 formed on the trailing edge of each section. The hi-hat is preferably formed from a die-cast strip of material inserted within a notch 64 and secured in position by a spot weld. Extending through the hi-hat is a guide band 66 having hook 68 formed in the termination thereof. It will be noted that the band extends from and is integral with the hi-hat on each section except the lowermost section.

As the bowl sections are moved by relative tangential force between the two handles thereof, the guide band 60 will slip through the hi-hat 62 on the adjacent section until the hook 68 co-acts therewith to position the adjacent section in contiguous relationship and to pull the adjacent section along in a fan-like erection of the bowl. To hold the bowl in the assembled condition, hook 70 is provided which is movably mounted on handle 58 with a hook formed thereon to engage handle 60. This hook also serves to hold the sections in the nested relationship. The band and hook are preferably formed of sheet stock with a black oxide finish. It will be noted that the hook should be inserted within the hi-hat on the adjacent section before the apexes of the sections are connected.

The center post 20 is removably mounted within the hub 52 of the bowl by the co-action of the shoulder 72 thereof with the extremity of the hub 56. The center post is secured in position by a wing nut 74 threadably engaging the center post.

The bowl is supported by a guide band 76 which is a circular band having inserts 78 formed thereon for insertion within the ends of the tubular leg member 12. The circular band is best shown in FIGURES 11 and 12. In these figures there is shown a circular guide band 76 comprising two semi-circular sections 79 and 80 hingedly connected together by pin 82. Circumferentially spaced along the guide band are inserts 78. The inserts are spaced along the circumference of the guide band so that they will be insertable within the legs when formed into a tripod to secure the legs in the tripod position and to distribute the load of the grill bowl to the tripod legs. To form a rigid band a flange 84 is formed in the end of member 79 which co-acts with a notch 86 in band 80 when the semi-circular sections are opened into a circular band. The band serves as a mount for the bowl. The bowl may be attached to the band. However, to correct for ground irregularities, the bowl may be merely positioned on the band. Thus, if the tripod is on uneven ground, the bowl may be moved from a concentric relationship to a level aspect.

To collapse the tripod support into convenient carrying packages, the user first removes the leg extensions 12 from the tripod assembly generally designated 10. The tripod assembly can then be nested as is best shown in FIGURES 13 and 14. The legs of the tripod assembly 90 are movably mounted within a guide support 92 and affixed thereto by pins 96. The guide support comprises three guides 98 having flanges 100 extending in nested relationship and secured together by such means as a bolt 102 and nut 104. Each guide is provided with an inclined guide wall 106 which co-acts with the wall of the leg 90 as it is swung into the tripod arrangement from the nested position. It will be noted that the legs may be fabricated from a single length. However, I have found it preferable to form the legs in separable shorter lengths for convenience in transport. The legs of the tripod assembly are preferably fabricated from tubing such as stock aluminum tubing having a flared upper end to receive the extension which is inserted therein in frictional engagement therewith.

It will be understood that this invention will be variously embodied and modified within the scope of the subjoined claims.

What is claimed is:

1. A collapsible barbecue comprising a fire bowl, a center post, and an annular grill movably mounted above said bowl; said fire bowl being formed of a plurality of wedge-shaped sections hingedly connected at the apex thereof, said sections adapted to be nested in superimposed relationship and having means coupling each section together to locate said sections in contiguous relationship to adjacent sections as said bowl sections are fanned from the nested position to form a bowl; said center post being removably mounted in said bowl to extend upwardly from the apex of said bowl sections, said center post having a threaded external surface; said annular grill being formed from a central hub having a threaded internal surface to threadably engage said upstanding center post, said hub being provided with an annular grill support and an annular member with an axially extending skirt, a plurality of wedge-shaped grill sections, each of said grill sections having a hook at the apex thereof, said grill sections adapted to be positioned about said hub in contiguous relationship with said hook engaging said skirt and with said grill support supportably engaging said grill sections each of said grill sections being tiltable about said hook without disengagement.

2. A barbecue according to claim 1 which includes a plurality of wedge-shaped plate sections, each of said plate sections having a hook at the apex thereof, each of said plate sections adapted to be positioned about said hub with said hook engaging said skirt and with said grill support supportably engaging said plate section.

3. A collapsible barbecue comprising a fire bowl, an annular grill movably mounted above said bowl, means for adjustably mounting said grill over said bowl; and means for supporting said bowl; said fire bowl formed of a plurality of wedge-shaped sections hingedly coupled at the apex thereof, said sections adapted to be nested in superimposed relationship, and means coupling each section to an adjacent section to locate said adjacent section in contiguous relationship when said sections are fanned out to form said bowl, said grill being formed of a plurality of wedge-shaped sections adapted to be nested in superimposed relationship and adapted to be mounted in contiguous relationship to form said annular grill, said supporting means comprising a tripod extendable from a nested position in which said legs are axially aligned to a tripod position and a guide ring adapted to hold said legs in said tripod position and to supportably engage said bowl in frictional engagement therewith.

4. A barbecue in accordance with claim 1 which includes a tripod, each of the legs of said tripod being tubular, and an annular guide ring, said guide ring adapted to supportably engage said bowl and having inserts spaced along said ring, each of said inserts adapted for insertion within a respective tubular leg.

5. A barbecue in accordance with claim 1 which includes three legs hingedly connected together and adapted to be moved from a stacked position in which said legs are in parallel relationship to an unstacked position in which said legs are arranged in a tripod arrangement, three leg extensions, each of said leg extensions being adapted for insertion in said tripod legs, and a guide ring comprising a circular ring having inserts spaced along the periphery thereof, said inserts adapted to co-act with the legs to restrain said legs from movement and to serve as a mounting member upon which said bowl is frictionally positioned.

References Cited in the file of this patent

UNITED STATES PATENTS

| | | |
|---|---|---|
| 871,266 | Gertenbach | Nov. 19, 1907 |
| 1,530,815 | Dear | Mar. 24, 1925 |
| 2,227,608 | Tinnerman | Jan. 7, 1941 |
| 2,302,984 | Tollzien | Nov. 24, 1942 |
| 2,314,248 | Rutledge | Mar. 16, 1943 |
| 2,519,263 | Lucas | Aug. 15, 1950 |
| 2,621,007 | Barbin | Dec. 9, 1952 |
| 2,740,395 | Goodwin | Apr. 3, 1956 |
| 2,770,229 | Tarcici | Nov. 13, 1956 |
| 2,806,134 | Tarcici | Sept. 10, 1957 |
| 2,841,352 | Pappas | July 1, 1958 |